(No Model.)
A. G. WATERHOUSE.
GOVERNOR FOR DYNAMOS OR MOTORS.
No. 420,398. Patented Jan. 28, 1890.
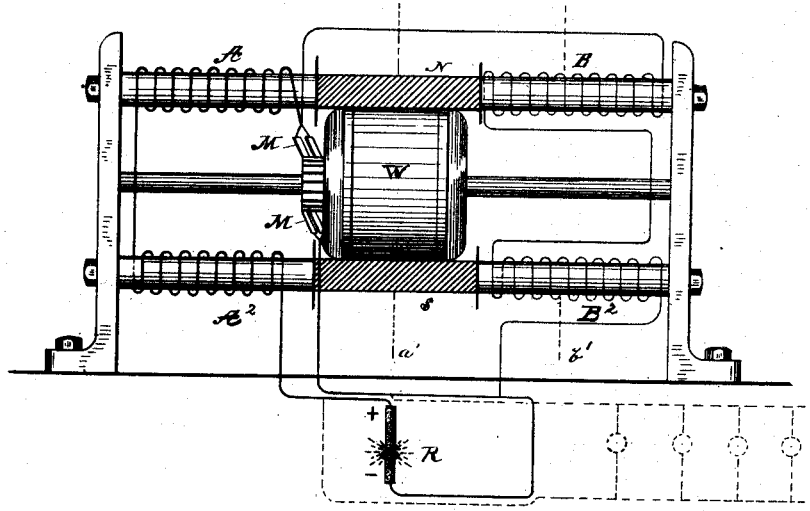
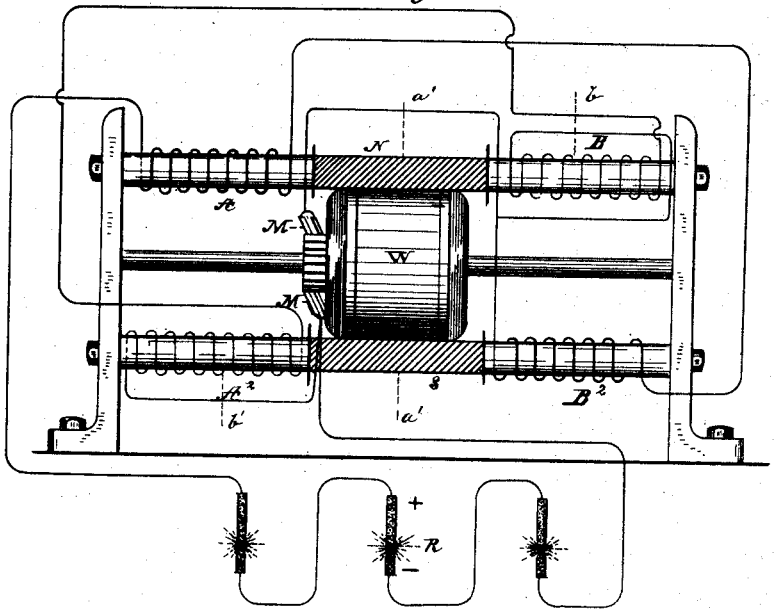
WITNESSES:
INVENTOR
A. G. Waterhouse
BY
ATTORNEY

UNITED STATES PATENT OFFICE.

ADDISON G. WATERHOUSE, OF HARTFORD, CONNECTICUT, ASSIGNOR, BY MESNE ASSIGNMENTS, TO THE SCHUYLER ELECTRIC COMPANY, OF CONNECTICUT.

GOVERNOR FOR DYNAMOS OR MOTORS.

SPECIFICATION forming part of Letters Patent No. 420,398, dated January 28, 1890.

Application filed September 24, 1885. Serial No. 177,992. (No model.)

*To all whom it may concern:*

Be it known that I, ADDISON G. WATERHOUSE, a citizen of the United States, and a resident of Hartford, in the county of Hartford and State of Connecticut, have invented certain new and useful Governors for Dynamo-Electric Generators or Motors, of which the following is a specification.

My invention relates to means for regulating or controlling the action of dynamo-electric generators or motors according to changed conditions of circuits, driving-power, current load, &c., requiring a modification in the generating capacity of the machine if it be used as a generator, or in its mechanical power if it be used as a motor.

My invention relates to a combination in which magnetizing-coils for the machine are applied and connected in such way that the regulation is effected automatically by changes of the distribution of current in two sets of coils, one forming a portion of the main circuit with the armature, and the other a portion of a derived circuit.

My invention consists in combining with the field-magnet two sets of coils, so arranged that if the current in one set be increased, while the current in the other is diminished or remains stationary, the field magnetism will be shifted transversely across the armature, and in placing one set of such coils in a derived circuit to the other, the armature being arranged to revolve in such relation to the pole-pieces that the shifting of the magnetism by the action of the coils will be in a direction transverse to the armature.

In the accompanying drawings, Figure 1 shows in side elevation and partial section a machine having its coils arranged in accordance with my invention. Fig. 2 illustrates another arrangement of the coils.

In Fig. 1, A A² B B² indicate the four legs of a rectangular field-magnet, and N S the field-of-force pole-pieces, in which the coils of wire upon the legs conspire to produce consequent magnetism after the well-known manner.

The armature W is arranged to rotate between the pole-pieces in such direction that if the consequent magnetism of the pole-piece be shifted by any change in the relative magnetizing-power of the coils, such shifting will take place in a line transverse to the armature, and will result in a change of the position of the magnetism with relation to the same, so that the intensity of the magnetic field in which the armature rotates will be lessened, and the operative efficiency of the machine be correspondingly modified, whether the same be used as a generator or a motor.

The brushes for the commutator of the armature are indicated at M M. The coils A A² are the main field magnetizing-coils of low resistance connected into circuit with the armature and with the external circuit after the usual manner.

In the present instance I have shown the external circuit as one containing a series of electric-arc lamps; but it will of course be understood that the working-resistance may consist of any other devices, or that the circuit may be a circuit from a generating-source when the machine is used as a motor.

The coils B B² are of fine wire and high resistance, and are in a derived circuit, as shown, so that a variation in the distribution of current in the coils A A² and B B² will take place on any change of external resistance when the machine is used as a generator, or on any change of load when the machine is used as a motor on a constant-current circuit, so that with a constant current the increased counter electro-motive force developed in the armature by increase of speed act as a greater resistance in the branch containing the armature to cause more flow in the derived branch containing the coils B B².

The change in the flow of current in coils A A²—as, for instance, an increase of flow and a simultaneous decrease of flow in coils B B²—will shift the magnetism of the field-magnet poles to the right, or in a direction which, if the shifting continue, would result in bringing the location of greatest polar magnetism to a point where it would be included between the lines $a'$ $a'$ $b'$ $b'$. This would result in diminishing the effective action of the machine, since under such conditions the total magnetism acting upon the armature would be lessened.

If the machine be used as a generator and with an arc light or series circuit, a diminution in the number of lamps will, by diminishing the resistance in the circuit-coils A A², obviously result in the action just stated, the coils B B² then carrying less current, by virtue of the fact that they are in derived circuit. There results from such change a diminution in the electro-motive force of current generated by the armature, and a restoration of the strength of current on the working-circuit to its normal.

The reintroduction of lamps will restore the proper proportion of resistance as between the external circuit including the lamps and the coils A A², and the derived circuit including the coils B B², so as to cause a normal distribution of current in the two sets of coils, and to thus cause a shifting of the maximum field-magnetism back (in a transverse direction) into its normal position in the field-magnet pole-pieces N S.

It is not necessary that the field magnetism should be caused to shift at both sides of the armature in the same direction, since the coils may be so wound as to cause the consequent magnetism of one pole to shift to the right off the armature and to shift to the left in the other pole. Such an arrangement is indicated in Fig. 2, the coils A B² being there connected into the main circuit with the working-resistance and the coils A² B into the derived circuit of high resistance. The effect in the diminution of flow in the coils A² B, and the simultaneous increase of flow in A B² resulting from any decrease of external resistance will obviously be to cause the field magnetism of the upper pole-piece to shift to the right and that of the lower pole-piece to shift to the left. From this there would obviously result a less effective action of the armature, owing to the fact that the points of greatest consequent magnetism in the field are not directly over the whole armature, but lie partially to one side thereof in a transverse direction.

The restoration of the machine to its normal condition will obviously result from the restoration of the current-flow in the two sets of coils to normal, and the consequent shifting of the field magnetism to a point where the whole length of the armature-conductor on the field-magnet will move transversely through the most effective portion of the field.

It is obvious that my invention may be applied to any arrangement of working-resistances in the external circuit, and I find in practice that it is especially adapted for use with an external circuit of working-resistances consisting of incandescent lamps arranged in multiple arc, as indicated in dotted lines in Fig. 1. In this case a diminution in the number of lamps will result in an increase of external resistance, so that more current will be forced into the circuit containing the coils B B², and the field magnetism will be forced transversely across the armature, but in a direction to the left of the pole-pieces. The result will be, as before, a diminution in the capacity of the effectiveness of the machine to suit the change in the number of lamps to be operated.

I do not claim herein the method of regulating or controlling the operative capacity of a dynamo-electric machine or motor by shifting the field magnetism transversely across the armature, as this forms the subject of a claim in another application for patent filed by me on the same date with this.

What I claim as my invention is—

The combination, in a dynamo-electric machine, of main and derived circuit-coils applied to separate legs of the field-magnet, and an armature rotating in the magnetic field in a plane such that a shift of the consequent magnetism by variations of exciting current will cause the field magnetism to move transversely to the armature, as and for the purpose described.

Signed at Hartford, in the county of Hartford and State of Connecticut.

ADDISON G. WATERHOUSE.

Witnesses:
CHAS. E. DUSTIN,
W. H. NEWELL.